(12) United States Patent
Kim et al.

(10) Patent No.: US 7,957,586 B2
(45) Date of Patent: Jun. 7, 2011

(54) METHOD FOR CONVERTING COLOR SPACE OF IMAGE SIGNAL

(75) Inventors: Jong-Myon Kim, Yongin-si (KR); Dongsoo Kang, Hwasung-si (KR); Kyoung-June Min, Yongin-si (KR); Eun-Jin Ryu, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 905 days.

(21) Appl. No.: 11/715,814

(22) Filed: Mar. 8, 2007

(65) Prior Publication Data

US 2007/0217674 A1    Sep. 20, 2007

(30) Foreign Application Priority Data

Mar. 8, 2006    (KR) .................. 10-2006-0021805

(51) Int. Cl.
*G06K 9/00* (2006.01)
(52) U.S. Cl. .................................................. 382/162
(58) Field of Classification Search .......... 382/162, 382/166–167; 345/88; 358/518–520; 348/222.1, 348/229.1, 253–254, 659–661, 675
See application file for complete search history.

(56) References Cited

U.S. PATENT DOCUMENTS

| | | | | |
|---|---|---|---|---|
| 5,568,192 A | * | 10/1996 | Hannah | 348/222.1 |
| 5,668,646 A | * | 9/1997 | Katayama et al. | 358/530 |
| 5,909,505 A | * | 6/1999 | Katayama et al. | 382/164 |
| 6,463,173 B1 | * | 10/2002 | Tretter | 382/168 |
| 7,535,606 B1 | * | 5/2009 | Walton et al. | 358/509 |

\* cited by examiner

*Primary Examiner* — Jose L Couso

(74) *Attorney, Agent, or Firm* — NSIP Law

(57) ABSTRACT

Provided is a method for converting a first image signal expressed in a first color space into a second image signal expressed in a second color space on a subword parallelism basis. The method includes determining a first image parameter of a second image signal matrix as a function calculated by multiplying conversion coefficients of a first row constituting an image conversion matrix by image parameters constituting a first image signal matrix; determining a second image parameter of the second image signal matrix as a function expressed by at least one of image parameters constituting the first image signal matrix and the determined first image parameter of the second image signal matrix; determining a third image parameter of the second image signal matrix as a function expressed by at least one image parameter unused for determining the second image parameter of the second image signal matrix among the image parameters constituting the first image signal matrix, and by the determined first image parameter of the second image signal matrix; and finally calculating the second image signal matrix by shifting the determined image parameters constituting the second image signal matrix by a predetermined number of bits.

12 Claims, 4 Drawing Sheets

METHOD FOR CONVERTING COLOR SPACE OF IMAGE SIGNAL

PRIORITY

This application claims priority under 35 U.S.C. §119(a) to a Korean Patent Application filed in the Korean Intellectual Property Office on Mar. 8, 2006 and assigned Serial No. 2006-21805, the disclosure of which is incorporated herein by reference.

BACKGROUND OF THE INVENTION

1. Field of the Invention

The present invention relates generally to a data processing technique of a portable multimedia apparatus, and in particular, to a subword parallelism technique for efficiently processing multimedia data and a method for converting input data.

2. Description of the Related Art

In a multichannel image coding scheme, standard images can be expressed with image signals based on vector values, and each pixel of the images is composed of three components, i.e., Red, Green and Blue (RGB). However, the RGB color space is not suitable to be recognized by human beings. In order to solve this problem, the image and video processing field frame-coverts the RGB color space into a YCbCr color space. The YCbCr color space is a color coordinate space based on the color perceptibility of humans, and because the human eye is less susceptible to high frequency in terms of chrominance (for example, Cb and Cr), humans cannot recognize color distortion with the naked eye even though it undergoes undersampling. In addition, a luminance component Y of the image can be processed independently of the chrominance components Cb and Cr.

Meanwhile, a subword parallelism technique that can simultaneously operate for several small data elements, like 8-bit pixels, is used for image processing. For subword parallelism, several small data elements (for example, 8-bit pixels) are packed into one large register while the individual elements are processed in parallel.

FIG. 1 is a conceptual diagram of the conventional subword parallelism technique.

Referring to FIG. 1, in a 32-bit parallelism mechanism divided into four 8-bit Arithmetic Logic Units (ALUs) 110, 120, 130 and 140, two 32-bit words 11 and 13, including information, are being processed.

The words 11 and 13 each include 3 subwords having Y, Cb and Cr information. In this case, the 8 Least Significant Bit (LSB) bits of each word are unused. The subwords undergo computation in their associated ALUs 110, 120, 130 and 140, and are output as another word 15.

However, in the subword parallelism technique, not only because chrominance data is not arranged in a range of a square of 2, but also because the type of the stored data is not suitable for computation, overhead for processing the data occurs, affecting data processing capability.

FIGS. 2A and 2B are conceptual diagrams of packing and unpacking processes in the conventional subword parallelism technique.

In FIG. 2A, the subword parallelism technique parallel-adds 8-bit $Y_1$, $Cb_1$, and $Cr_1$, stored in a first register $R_1$ to associated 8-bit $Y_0$, $Cb_0$ and $Cr_0$ stored in a second register $R_2$, and stores the resulting value in an 8-bit region of a third register $R_3$. However, the resulting value obtained by adding 8-bit data to 8-bit data may exceed 8 in the number of bits, causing overflow. In this case, the desired resulting value cannot be obtained.

In order to solve this problem, the conventional subword parallelism technique uses an unpack instruction. That is, the subword parallelism technique shifts an 8-bit $Y_1$ value in the first register $R_1$ to a fourth 32-bit register (not shown), shifts an 8-bit $Y_0$ value in the second register $R_2$ to a fifth 32-bit register (not shown), performs addition computation thereon, and stores the resulting value in a sixth 32-bit register (not shown).

FIG. 2B illustrates an exemplary method of storing 16-bit values stored in a first register $R_1$ and a second register $R_2$, in a 32-bit register divided in 8 bits.

In this case, if at least one of $C_0$, $C_1$, $C_2$ and $C_3$ is greater than 255 (binary 11111111), 255 is stored in a designated location of a divided third register $R_3$. However, this packing/unpacking process increases the number of instruction executions in the image processing process, causing performance degradation of the image processing technique. Therefore, various process architectures are being proposed in order to reduce the computation overhead.

FIG. 3 is a conceptual diagram for a description of the conventional 48-bit datapath subword parallelism technique for solving the computation overhead problem.

Referring to FIG. 3, four 12-bit ALUs are used for processing 8-bit pixels. In this case, the subword parallelism technique performs computation on 8-bit data signals in their associated 12-bit ALUs 310, 320, 330 and 340, and stores the resulting values in a 12-bit storage 37. Therefore, it is possible to solve the overflow problem which may occur in the 8-bit computation. However, the subword parallelism technique may increase the size and cost of the hardware because it uses the 12-bit ALUs.

SUMMARY OF THE INVENTION

An aspect of the present invention is to address at least the problems and/or disadvantages and to provide at least the advantages described below. Accordingly, an aspect of the present invention is to provide a subword parallelism technique capable of preventing the occurrence of overflow during multimedia data processing without an increase in hardware.

Another aspect of the present invention is to provide a subword parallelism technique capable of reducing processing delay due to overhead instruction by reducing a bit width of input data.

According to one aspect of the present invention, there is provided a method for converting a first image signal expressed in a first color space into a second image signal expressed in a second color space on a subword parallelism basis. The method includes determining a first image parameter of a second image signal matrix as a function calculated by multiplying conversion coefficients of a first row constituting an image conversion matrix by image parameters constituting a first image signal matrix; determining a second image parameter of the second image signal matrix as a function expressed by at least one of image parameters constituting the first image signal matrix and the determined first image parameter of the second image signal matrix; determining a third image parameter of the second image signal matrix as a function expressed by at least one image parameter unused for determining the second image parameter of the second image signal matrix among the image parameters constituting the first image signal matrix, and by the determined first image parameter of the second image signal matrix; and finally calculating the second image signal matrix by shifting the determined image parameters constituting the second image signal matrix by a predetermined number of bits.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EXEMPLARY EMBODIMENTS

Exemplary embodiments of the present invention will now be described in detail with reference to the annexed drawings. In the following description, a detailed description of known functions and configurations incorporated herein has been omitted for clarity and conciseness.

The present invention increases the subword parallelism efficiency by reducing the number of data bits used for subword parallelism.

Figure 1:
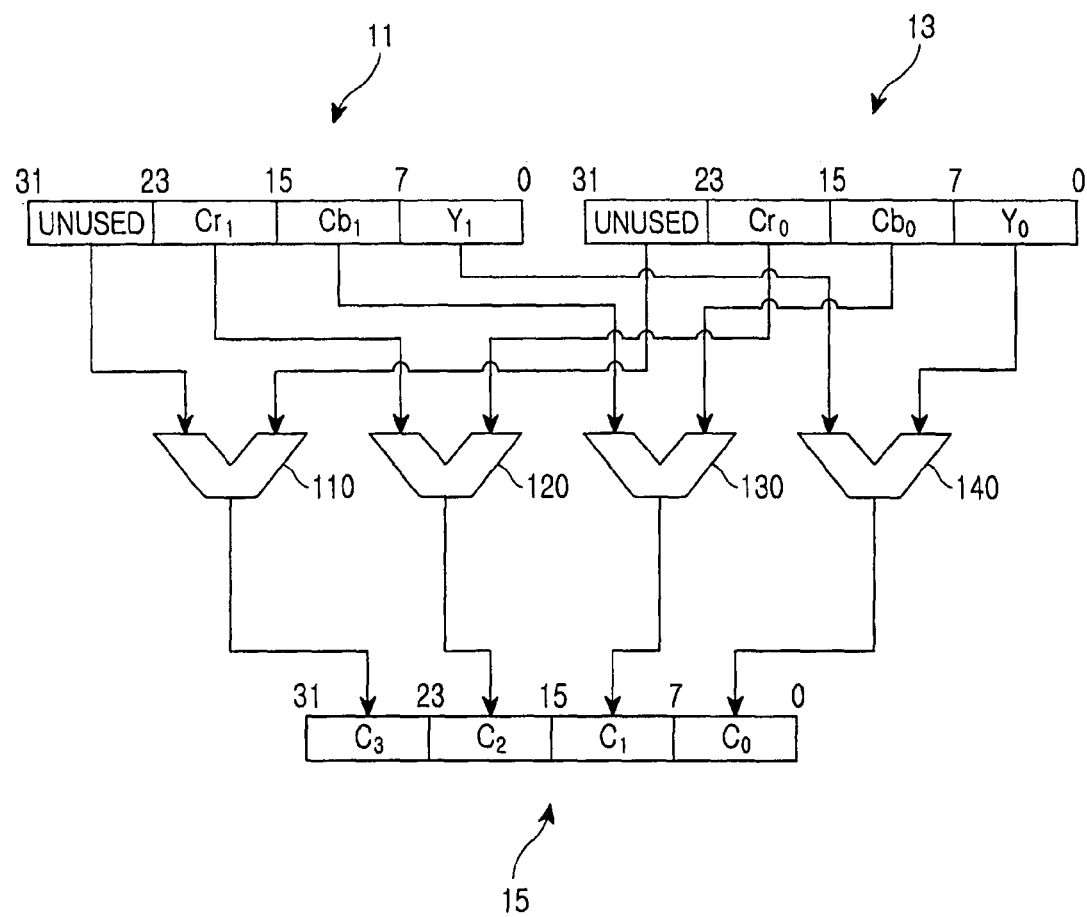
FIG. 1 is a conceptual diagram of the conventional subword parallelism technique.
Figure 2A:
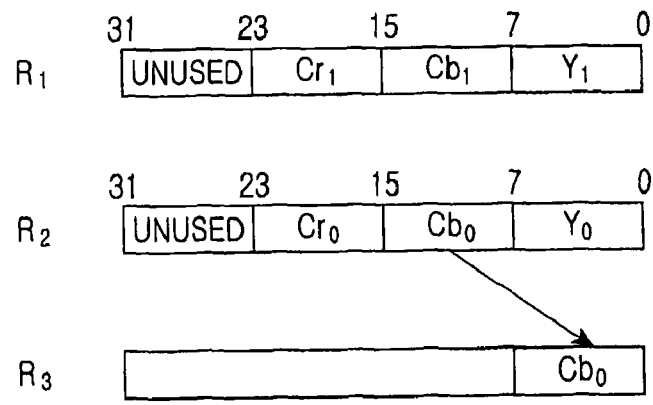
FIGS. 2A and 2B are conceptual diagrams of packing and unpacking processes in the conventional subword parallelism technique.
Figure 2B:
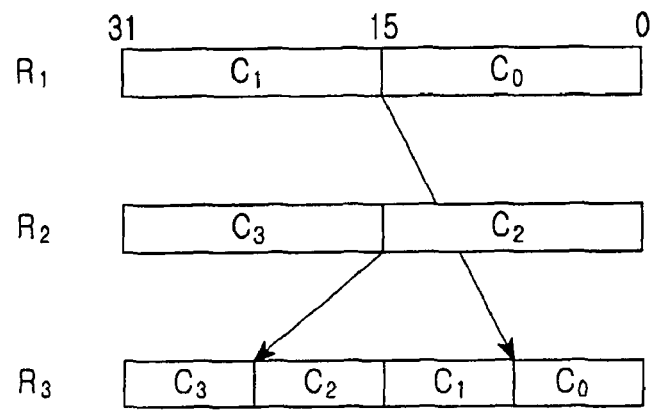
Figure 3:
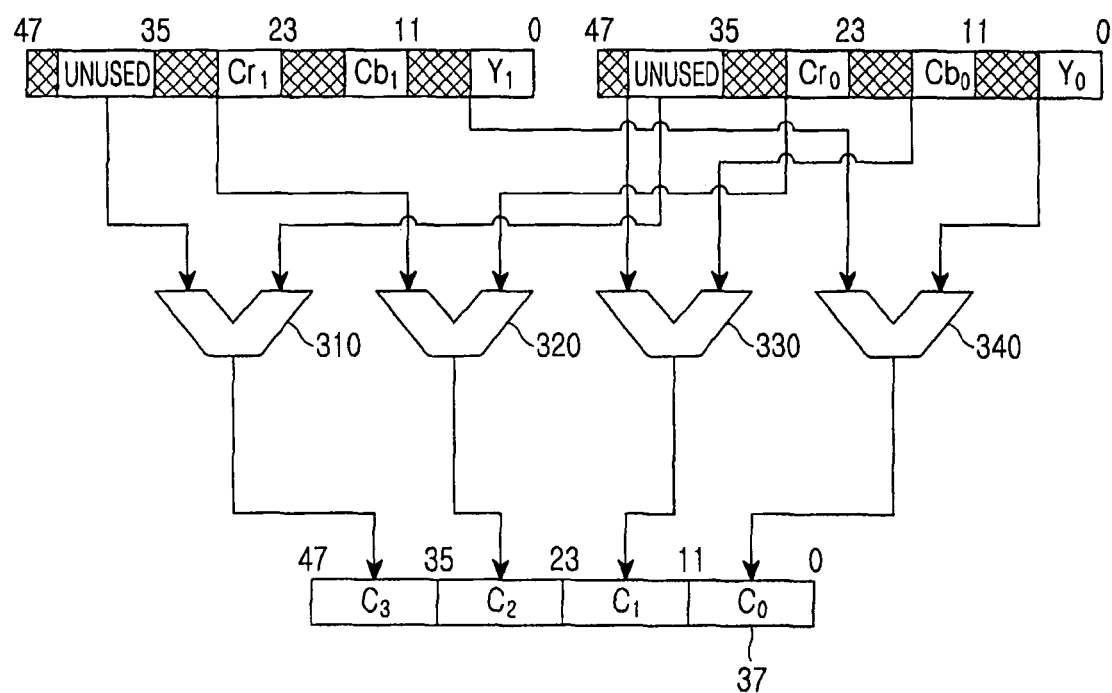
FIG. 3 is a conceptual diagram of the conventional 48-bit datapath subword parallelism technique.
Figure 4:
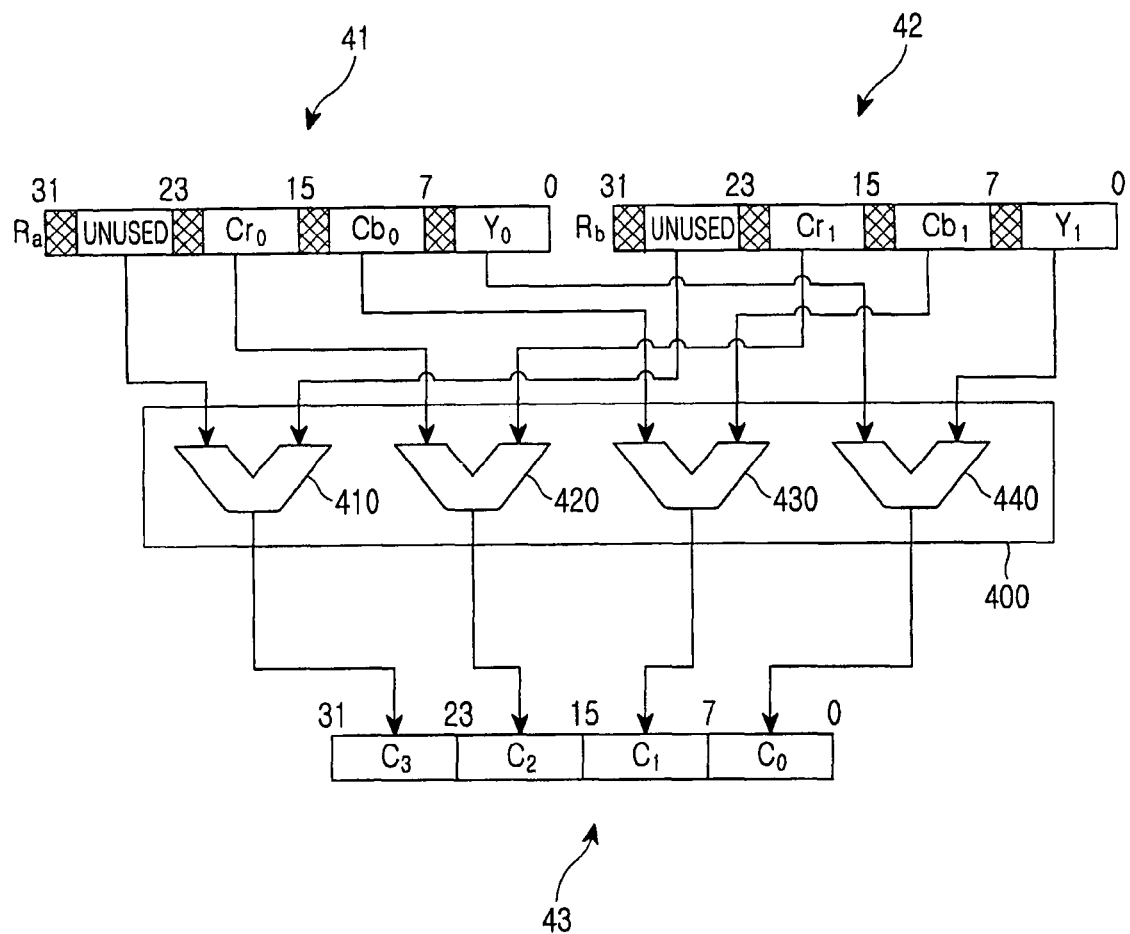
FIG. 4 is a conceptual diagram of a subword parallelism technique according to an embodiment of the present invention.

As shown in the conceptual diagram of FIG. 4, in a new subword parallelism technique according to an embodiment of the present invention, a 32-bit parallelism mechanism 400 divided into the conventional 8-bit Arithmetic Logic Units (ALUs) 410, 420, 430 and 440 is used as it is.

An embodiment of the present invention will be described herein for an exemplary process of parallel-computing 4 data signals stored in two 32-bit registers 41 and 42.

Subwords $Y_0$, $Cb_0$ and $Cr_0$ are successively arranged in a first register $R_a$ 41 from the Most Significant Bit (MSB) position, and subwords $Y_1$, $Cb_1$, and $Cr_1$ are successively arranged in a second register $R_b$ 42 from the MSB position.

The subwords stored in the first and second registers 41 and 42 are the values received after being converted into values having less than 8 bits in a color converter (not shown) connected to the front end of a multimedia processor where the subword parallelism according to an embodiment of the present invention is performed. In the YCbCr color space, even though the number of bits of the elements is reduced to a predetermined number of bits, noticeable quality degradation may not occur.

If the data signals having less than 8 bits undergo additional computation, the resulting values may not exceed 8 in the number of bits. Therefore, even though the resulting values are stored in the conventional 8-bit ALUs, no overflow may occur, enabling accurate computation.

A description will now be made of a method for reducing a size (the number of bits) of data in a color converter according to an embodiment of the present invention.

An image signal input to the color converter is a signal composed of image parameters R, G and B, and the color converter converts the RGB signal into a YCbCr signal. Here, a relationship between the RGB image signal and the YCbCr image signal is expressed with an image conversion matrix shown in Equation (1).

$$\begin{bmatrix} Y \\ Cb \\ Cr \end{bmatrix} = \begin{bmatrix} 0.299 & 0.587 & 0.114 \\ -0.168 & -0.331 & 0.500 \\ 0.500 & -0.419 & -0.081 \end{bmatrix} \begin{bmatrix} R \\ G \\ B \end{bmatrix} \quad (1)$$

In Equation (1), coefficients of a 3×3 image conversion matrix, which are multiplied by R, G and B, are known values calculated for optimization of color conversion.

According to Equation (1), Y, Cr and Cb parameters are expressed as functions based on R, G and B, respectively. Therefore, in order to reduce a size of the 8-bit R, G and B data signals with the use of Equation (1), it is necessary to shift the coefficients multiplied by R, G and B, by the desired number of bits to be reduced. Accordingly, the color converter uses 9 barrel shifters in order to shift 9 coefficients.

However, Equation (1) can be converted into Equation (2).

$$\begin{bmatrix} Y \\ Cb \\ Cr \end{bmatrix} = \begin{cases} 0.299R + 0.587G + 0.114B \\ 0.546(B - Y) \\ 0.713(R - Y) \end{cases} \quad (2)$$

According to Equation (2), Y denotes a function for R, G and B, and Cb and Cr are converted into functions for Y and B, and for Y and R, respectively. In this manner, the 9 coefficients in Equation (1) can be reduced to 5 coefficients. As a result, the number of barrel shifters used for the color converter can also be reduced from 9 to 5.

Next, according to an embodiment of the present invention, the coefficients are divided by a square of 2 for the desired number of bits to be reduced, as shown in Equation (3).

$$\begin{bmatrix} Y \\ Cb \\ Cr \end{bmatrix} = \begin{cases} 0.299R/m + 0.587G/m + 0.114B/m \\ 0.546/m(B - Y) \\ 0.713/m(R - Y) \end{cases} \quad (3)$$

where $m = 2^{8-n}$.

That is, the Y, Cb and Cr values calculated by Equation (3) each have an n-bit value. Herein, n can be set to a value greater than or equal to 4, and less than 8, in order to prevent noticeable quality degradation for the data initially input to the color converter, and it can be properly adjusted by the user within the above range according to the system used. For example, when the values are used as data to be displayed on a small screen like a mobile phone screen, n can be set to 4, and when the values are used as data to be displayed on a large screen like a computer monitor, n can be set to 7.

In addition, when the present invention is applied to a YUV color space, YUV can be expressed as Equation (4).

$$\begin{bmatrix} Y \\ U \\ V \end{bmatrix} = \begin{cases} 0.299R + 0.587G + 0.114B \\ 0.493(B - Y) \\ 0.877(R - Y) \end{cases} \quad (4)$$

Similarly, when the present invention is applied to a YIQ color space, YIQ can be expressed as Equation (5).

$$\begin{bmatrix} Y \\ I \\ Q \end{bmatrix} = \begin{cases} 0.299R + 0.587G + 0.114B \\ 0.736(R-Y) - 0.268(B-Y) \\ 0.478(R-Y) + 0.413(B-Y) \end{cases} \quad (5)$$

For Equation (4) and Equation (5), n-bit image signal parameters can be finally obtained by dividing the coefficients by a square of 2 for the desired number of bits to be reduced, as shown in Equation (3). In addition, according to Equation (4), the number of barrel shifters used for the color converter can be reduced to 5, and according to Equation (5), the number of barrel shifters used for the color converter can be reduced to 7.

Although an embodiment of the present invention has been described for the 32-bit datapath architecture by way of example, the present invention is not limited thereto and can also be applied to 64-bit or 128-bit datapath architecture.

As can be understood from the foregoing description, the new subword parallelism technique can reduce the number of bits constituting a pixel (subword) within the limit of preventing noticeable quality degradation, thereby preventing overflow due to the additional computation.

In addition, the new subword parallelism technique, as it can reduce the length of subwords during computation, does not need the packing/unpacking process, thereby minimizing processing delay due to processing overhead.

Moreover, the present invention reduces the number of barrel shifters used for the color converter to reduce the length of subwords used for subword parallelism, thereby contributing to a reduction in hardware cost.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for converting, in a multimedia apparatus, a first image signal expressed in a first color space into a second image signal expressed in a second color space on a subword parallelism basis, the method comprising:
   determining, by a color converter processor, a first image parameter of a second image signal matrix as a function calculated by multiplying conversion coefficients of a first row constituting an image conversion matrix by image parameters constituting a first image signal matrix;
   determining, by the color converter processor, a second image parameter of the second image signal matrix as a function expressed by at least one of image parameters constituting the first image signal matrix and the determined first image parameter of the second image signal matrix;
   determining, by the color converter processor, a third image parameter of the second image signal matrix as a function expressed by at least one image parameter unused for determining the second image parameter of the second image signal matrix among the image parameters constituting the first image signal matrix, and by the determined first image parameter of the second image signal matrix; and
   calculating, by the color converter processor, the second image signal matrix by shifting the determined image parameters constituting the second image signal matrix by a predetermined number of bits.

2. The method of claim 1, wherein the parameters of the first image signal matrix are each comprised of 8 bits, and the parameters of the calculated second image signal matrix are each comprised of bits, the number of which is greater than or equal to 4, and less than 8.

3. The method of claim 2, wherein the determined image parameters constituting the second image signal matrix are each shifted, by the color converter processor, by a predetermined number of bits by dividing coefficients of the functions used for determining the parameters of the second image signal matrix, by $2^m$;
   wherein m is a value determined, by the color converter processor, by subtracting the number of bits of each of the parameters of the calculated second image signal from the number of bits of each of the parameters of the first image signal matrix.

4. The method of claim 1, wherein the first image signal matrix is comprised of R, G and B parameters, and the second image signal matrix is comprised of Y, Cb and Cr parameters;
   wherein Y is calculated by $Y=0.299R+0.587G+0.114B$.

5. The method of claim 4, wherein Cb is calculated by $C=0.564(B-Y)$.

6. The method of claim 4, wherein Cr is calculated by $Cr=0.713(R-Y)$.

7. The method of claim 1, wherein the first image signal matrix is comprised of R, G and B parameters, and the second image signal matrix is comprised of Y, U and V parameters;
   wherein Y is calculated by $Y=0.299R+0.587G+0.114B$.

8. The method of claim 7, wherein U is calculated by $U=0.493(B-Y)$.

9. The method of claim 7, wherein V is calculated by $V=0.877(R-Y)$.

10. The method of claim 1, wherein the first image signal matrix is comprised of R, G and B parameters, and the second image signal matrix is comprised of Y, I and Q parameters;
    wherein Y is calculated by $Y=0.299R+0.587G+0.114B$.

11. The method of claim 10, wherein I is calculated by $I=0.736(R-Y)-0.268(B-Y)$.

12. The method of claim 10, wherein Q is calculated by $Q=0.478(R-Y)+0.413(B-Y)$.

* * * * *